Sept. 27, 1938.  E. O. ROBINSON  2,131,673

TANK CARRYING TRUCK

Filed June 30, 1937   2 Sheets-Sheet 1

Inventor
E. O. Robinson
By H. B. Willson & Co.
Attorney

Sept. 27, 1938.  E. O. ROBINSON  2,131,673
TANK CARRYING TRUCK
Filed June 30, 1937   2 Sheets-Sheet 2

Inventor
E. O. Robinson

Patented Sept. 27, 1938

2,131,673

UNITED STATES PATENT OFFICE 2,131,673

TANK-CARRYING TRUCK

Eugene O. Robinson, Hutchinson, Kans.

Application June 30, 1937, Serial No. 151,262

7 Claims. (Cl. 280—53)

The invention relates to two-wheeled manually movable trucks designed primarily for carrying the gas tanks and other necessary equipment for oxy-acetylene welding, and it aims to provide a simple, inexpensive, compact and light truck which will so balance the load and support it upon the truck wheels, as to enable one man to easily move the loaded truck while standing erectly with his arms fully lowered.

In carrying out the above end, a further object is to provide a unique handle arrangement whereby the truck may be steered with ease even on unusually rough surfaces, said handle arrangement enabling the operator to easily resist any tendency which the truck may have to jerk from the intended course when either wheel strikes an obstruction. Moreover, this tendency is reduced to the minimum by providing unusually large rubber-tired wheels which also protect the gases against dangerous jars, permit easy rolling even on rough floors and the like, and in connection with a balanced load and improved handle arrangement, prevent any tendency of the truck to "nose over" when striking obstructions.

Another object is to provide a novel structure for carrying the tanks in tandem, enabling the production of an unusually narrow truck for easy movement through restricted passages, between machines and the like in a shop, etc.

Still further objects are to make novel provision for holding the truck wherever stopped, to provide improved means for safely holding the tanks upon the truck and permitting easy replacing of empty with full tanks, to make novel provision for supporting the gas hoses when wound around the tanks, to provide novel means for carrying welding rods, burner tips, tools, etc., and to provide a generally improved truck which will obviate a great deal of difficulty and inconvenience usually encountered by the welder in moving his equipment to the most advantageous point.

With the foregoing in view, the invention resides in the novel subject matter hereinafter described and claimed, description being accomplished by reference to the accompanying drawings.

Figure 1:
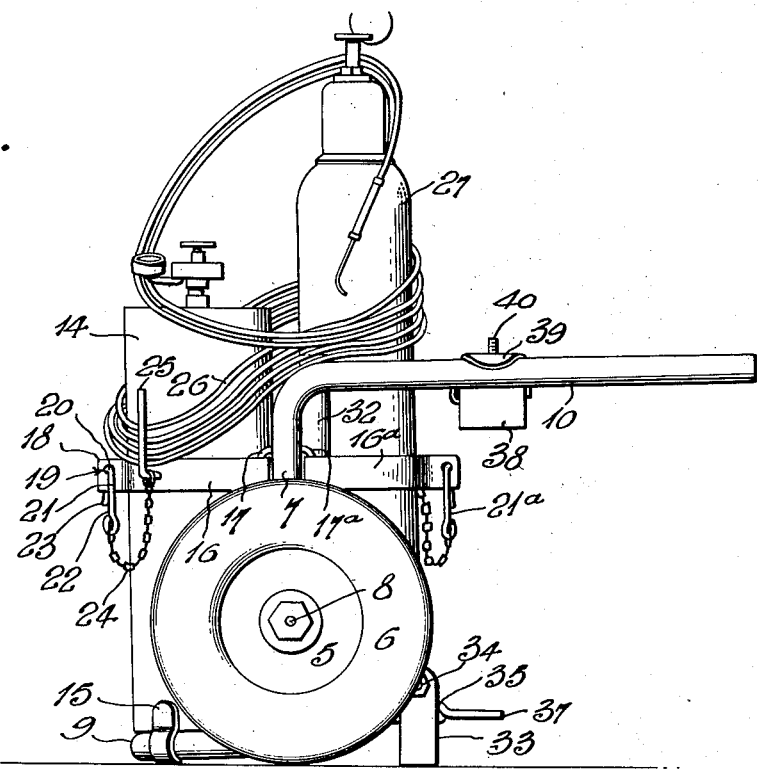
Fig. 1 is a side elevation of the improved truck and the oxygen and acetylene tanks carried thereby.
Figure 2:
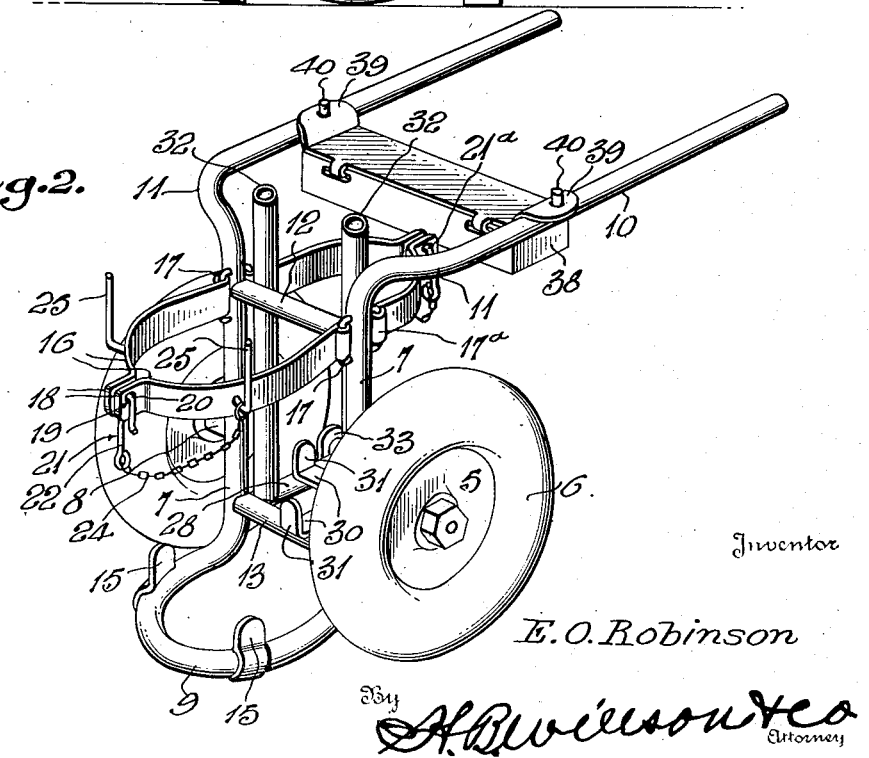
Fig. 2 is a front perspective view with the tanks removed.
Figure 3:
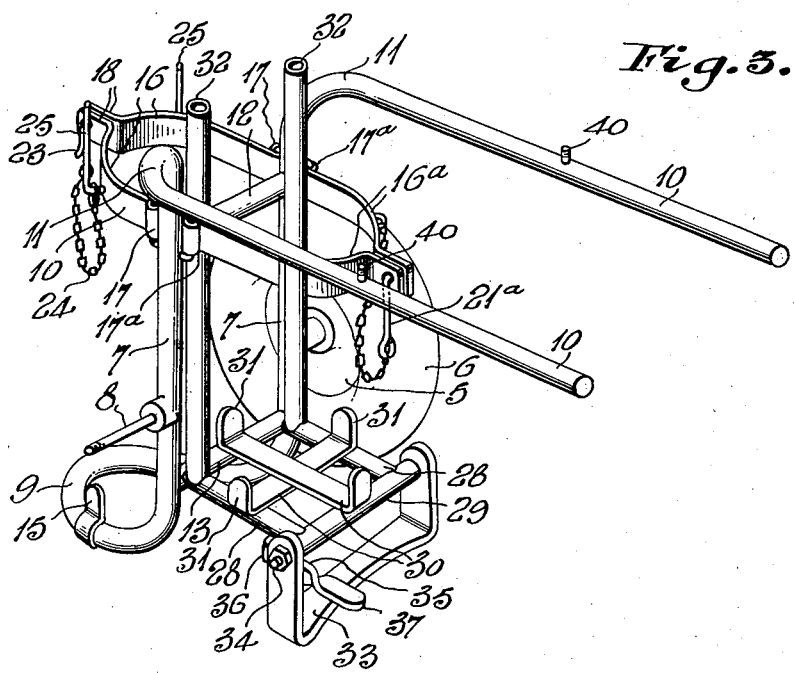
Fig. 3 is a rear perspective view.
Figure 4:
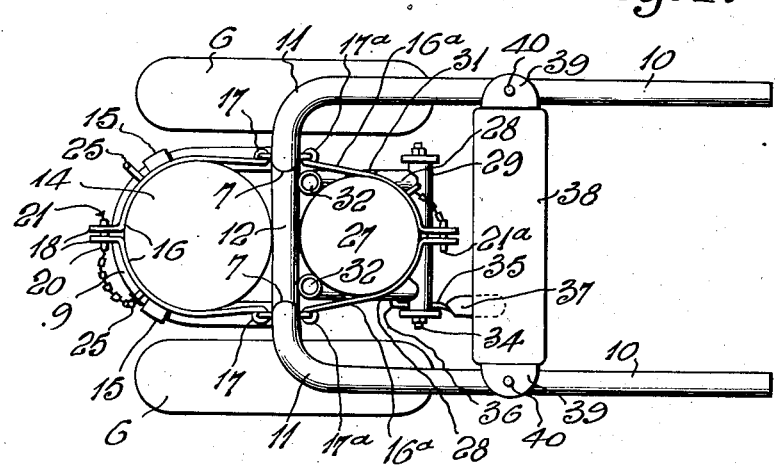
Fig. 4 is a top plan view.

A preferred construction has been shown and will be specifically described, with the understanding however, that within the scope of the invention as claimed, variations may be made.

Two laterally spaced axially alined wheels 5 are provided, said wheels being equipped with rubber tires 6 which are preferably of pneumatic type. Two vertically disposed standards 7 are provided at the inner sides of the wheels 5 and are provided with stub axles 8 upon which said wheels are anti-frictionally mounted in any preferred way. A horizontally disposed U-shaped tank support 9 is provided in front of the lower ends of the standards 7, the ends of said U-shaped support being integrally joined to said lower ends of said standards. At the upper ends of these standards, two substantially horizontal handles 10 are provided, said handles being integrally joined to said standards and projecting rearwardly at substantially right angles therefrom. The portions of these standards contiguous to the handles 10, are curved outwardly over the wheels as shown at 11, thereby spacing said handles sufficiently to admit a man between them, without the necessity of similarly spacing the standards and increasing the width of the truck. The standards 7, tank support 9 and handles 10 may well be bent from a single rod or pipe.

Upper and lower transverse bars 12 and 13 extend between the upper and lower portions of the two standards 7 and are welded or otherwise rigidly joined thereto. These bars abut the rear side of the oxygen tank 14 which rests upon the support 9, and the front portion of this support is provided with upwardly projecting lugs 15 which hold the lower end of said tank against forward shifting. The upper portion of the tank 14 is held in place by two tank-embracing arms 16 which are pivoted at 17 to the upper portions of the standards 7, the front ends of said arms 16 being provided with forwardly projecting lugs 18 having alined openings 19. The bight 20 of a hook 21 passes through these openings, the shank 22 of said hook extends downwardly from said bight and lies against the outer side of one of the lugs 18, and the bill 23 of said hook also extends downwardly from said bight and lies against the outer side of the other of said lugs. The openings 19 are so located that the hook 21 cannot be angled and disengaged from said openings until said hook is swung to an inverted position, it being thus insured that the hook shall not become accidentally released. This hook is preferably carried by a chain 24 secured to one of the arms 16 or to some other suitable part. These arms are provided with fingers 25 which extend outwardly and then upwardly therefrom. When the hook 21 is disengaged from the openings 19, the fingers 25 serve as handles for outwardly swinging the arms 16 to released position. These same fingers also assist in holding the gas hoses 26 when they are wrapped around the oxygen tank 14 and the acetylene tank 27. This tank 27 is carried behind the wheel axis to balance the weight of the oxygen tank 14, and the upper portion of said tank 27 is held in place by two tank-embracing arms 16ª which are connected with the standards 7 at 17ª and are held in closed position by a hook 21ª identical with the hook 21 and releasable in the same manner. The lower end of the tank 27 is supported and held in place by a novel construction now to be described.

Two horizontal bars 28 are welded or otherwise secured to the lower transverse bar 12, and a rear transverse bar 29 is similarly secured to the rear ends of said bars 28, said bars 28 and 29 as well as the bars 12 and 13 above described, being preferably formed from lengths of metal pipe and other tubing. Two crossed metal strips 30 have their ends welded or otherwise secured upon the bars 13, 28 and 29, the extremities of said strips being bent upwardly to provide lugs 31 to engage the lower end of the tank 27.

Two vertical tubes 32 are welded or otherwise secured at their lower ends to the bars 28 and at their upper portions to the bar 12 to abut the front of the tank 27 and cooperate with the lugs 31 and arms 16ª in stably holding said tank. The lower ends of these tubes 32 are closed and their upper ends are open and preferably flared, allowing convenient use of said tubes to hold welding rods.

A U-shaped floor-engaging support 33 is provided to coact with the front tank support 9 in supporting the entire frame structure against tilting after it has been moved to the desired point, and said supports 33 and 9 both engage the floor in such manner as to prevent any possibility of the truck rolling if it must occupy a position upon an inclined surface. The ends of the U-shaped support 33 extend across the ends of the tubular bar 29, and a pivot bolt or rod 34 passes longitudinally through said tubular bar and extends also through said end of said support 33, thereby so mounting this support as to allow convenient swinging from its lowered operative position to a raised inoperative position in which it allows free rolling of the truck. A metal strip 35 extends across one of the side members of the support 33 and is welded or otherwise secured thereto, the rear end 36 of said strip constituting a foot pedal for upwardly and downwardly swinging said support 33, while the front end 37 of said strip is bent laterally inward to underlie one of the bars 28, providing a stop which limits the movement of the support 33 to its operative position.

Due to the construction above described, the load is effectively balanced, and a man standing between the handles 10 may easily and conveniently roll the truck without the necessity of so tilting it that the load is thrown off-balance. Moreover, these handles are located so that the man moving the truck may stand erectly with his arms fully lowered at his sides, in which position, he may much more readily handle the truck. When the support 33 is disengaged from the floor and the handles 10 depressed slightly, the front tank support 9 clears the supporting surface and only a very slight portion of the load is carried by the arms of the user, enabling him to much more easily move the truck. Moreover, the rubber tired wheels are unusually large and therefore roll easily and pass readily over obstructions. If one wheel should strike an obstruction, there will of course be a slight tendency for the truck to swing laterally from its intended course, but the handles 10 projecting rearwardly from the frame, are of such length that the operator may readily resist such tendency, enabling unusually easy steering.

By positioning the tanks in tandem, not only do they effectively balance the load in front of and behind the wheel axis, but it is possible to produce a narrower truck readily movable in cramped quarters. Not only do the rubber tires permit easy movement but they protect the gas tanks against dangerous jarring and moreover, said tires will not mar even highly finished floors should it be necessary to roll the truck upon them in reaching the point at which welding is to be done.

Between the handles 10, behind the acetylene tank 27, I prefer to provide a transverse box 38 to contain welding tips, tools and any other accessories desired, the ends of said box being provided with upwardly and outwardly curved flanges 39 which hook over said handles 10. These handles are preferably provided with upstanding studs 40 passing through openings in the flanges 39 to hold them in place and to permit removal of the box when one tank 27 is to be removed and another installed. If desired, nuts (not shown) may be threaded upon the studs 40 to contact with the flanges 39 and hold them against accidental disengagement from said studs.

It will be seen from the foregoing that novel and advantageous provision has been made for carrying out the objects of the invention, and while preferred features of construction have been described, attention is again invited to the possibility of making variations within the scope of the invention as claimed.

I claim:

1. A tank carrying truck comprising two laterally spaced axially alined supporting wheels, two vertical standards at the inner sides of said wheels and supported thereby, a horizontal U-shaped tank support in front of said standards, the ends of said U-shaped support being rigidly joined to the lower ends of said standards, means for holding the tank in place upon said support, and two handles rigidly joined to and projecting rearwardly at substantially right angles from the upper ends of said standards, said upper ends of said standards being curved outwardly over said wheels to space said handles apart sufficiently to admit a man without the necessity of spacing said standards to the same extent, said handles projecting rearwardly to such an extent and being disposed at such an elevation as to allow the man to walk erectly between the handles with his arms fully lowered at his sides while gripping said handles and moving the truck.

2. In a tank carrying truck, a wheeled frame having vertical standards for disposition in front of a vertical tank, a front transverse bar extending between and rigidly joined to the lower ends of said standards, two spaced parallel bars rigidly joined to said front transverse bar and extending rearwardly therefrom, a rear transverse bar rigidly joined to the rear ends of said parallel bars, the four bars jointly forming substantially a square, two crossed metal strips having their end portions secured upon said bars respectively to support said tank, the extremities of said strips being bent upwardly to hold the lower end of said tank in place, and means for holding the upper end of said tank.

3. In a tank carrying truck, a wheeled frame having a front portion to rest normally upon the floor, the lower end of said frame being provided with a rearwardly projecting portion, a U-shaped floor-engaging support whose ends straddle and are pivoted to said rearwardly projecting frame portion, and a strip crossing and secured to one of the side members of said U-shaped support, the rear end of said strip constituting a pedal for swinging said support to and from operative position, the front end of said strip being laterally bent to underlie said rearwardly projecting frame portion and form a stop for limiting the downward movement of said support.

4. In a welding truck, a wheeled frame having means for supporting a vertical tank, said means including vertical tubes to abut said tank, the upper ends of said tubes being open and the lower ends of said tubes being closed, whereby said tubes constitute welding rod holders.

5. In a tank carrying truck, a frame having a support for a tank, two tank-embracing arms pivoted to said frame and having lugs on their free ends, said lugs having alined openings, and a hook whose bight passes through said openings, said hook having a shank extending downwardly from said bight and abutting the outer side of one of said lugs, said hook also having a bill extending downwardly from said bight and abutting the outer side of the other of said lugs, said openings being located nearer to the upper edges of said lugs than to the lower edges thereof in such positions that the hook cannot be removed from said openings until said hook is swung to an inverted position.

6. In a tank-carrying truck, two laterally spaced axially alined supporting wheels, a frame including two vertical standards at the inner sides of said wheels and supported thereby, a tank support secured to the lower ends of said standards, means for holding the tank in place on said support, and handles rigidly joined to and projecting rearwardly at substantially right angles from the upper ends of said standards, said upper ends of said standards being directed outwardly over said wheels to space said handles apart sufficiently to admit a man without the necessity of spacing said standards to the same extent, said handles projecting rearwardly to such an extent and being disposed at such an elevation as to allow the man to walk erectly between the handles with his arms fully lowered at his sides while gripping said handles and moving the truck.

7. In a tank-carrying truck, two laterally spaced axially alined supporting wheels, a frame including two vertical standards at the inner sides of said wheels and supported thereby, means for mounting one tank in front of said standards and a counterbalancing tank behind said standards, and two handles rigidly secured to and projecting rearwardly from the upper ends of said standards at substantially right angles thereto, said upper ends of said standards being directed outwardly over said wheels to space said handles apart sufficiently to allow a man to enter between them without the necessity of spacing said standards to the same extent, said handles projecting horizontally rearward to such an extent behind the position of the rear tank and being disposed at such an elevation that the man may enter between said handles, grip the same and erectly walk with his arms fully lowered at his sides without so tilting the frame as to throw the load off-balance.

EUGENE O. ROBINSON.